March 8, 1966  C. A. GURTLER  3,238,774
PRESSURIZED CELL MICROMETEOROID DETECTOR
Filed May 23, 1963

INVENTOR
CHARLES A. GURTLER

BY

ATTORNEYS

United States Patent Office 3,238,774
Patented Mar. 8, 1966

3,238,774
PRESSURIZED CELL MICROMETEOROID DETECTOR
Charles A. Gurtler, Yorktown, Va., assignor to the United States of America as represented by the Administrator of the National Aeronautics and Space Administration
Filed May 23, 1963, Ser. No. 282,818
3 Claims. (Cl. 73—170)
(Granted under Title 35, U.S. Code (1952), sec. 266)

The invention described herein may be manufactured and used by or for the Government of the United States of America for governmental purposes without the payment of any royalties thereon or therefor.

The invention relates to improvements in micrometeoroid detectors and more particularly concerns a pressurized cell micrometeoroid detector for obtaining a direct measurement of the micrometeoroid puncture hazard to thin structural materials.

There are several prior art micrometeoroid detectors; however, none of these detectors provide an adequate means for measuring the micrometeoroid puncture hazard to thin structural materials. One prior art micrometeoroid detector is a microphone detector which has been used for counting micrometeoroid particle impacts. This type detector will generate electrical impulses when impacted with particles and these impulses are fed into an electronic counter where they are counted. In addition to not being capable of measuring the micrometeoroid puncture hazard to thin structural materials, the microphone type detector has a further disadvantage of producing false counts from the creaking noise in the space vehicle caused by expansion and contraction due to temperature changes. Also any noise produced in the space vehicle by loose parts might produce false counts.

Another prior art micrometeoroid detector is a wire grid type detector which has been used on several satellites to detect the presence of micrometeoroids. This type detector consists of fine insulated wire wound on a thin sheet of insulating materials to form a wire card. When the wire card is struck by a micrometeoroid particle of sufficient energy to break the wire, the open circuit of the wire card is detected by a monitoring system. The wire grid detector is obviously not capable of measuring the micrometeoroid puncture hazard to thin structural materials.

A further prior art micrometeoroid detector is a light detecting cell which has been used to detect micrometeoroids. This type detector consists of a light sensitive cell in a container which is covered with a thin opaque material. When the material is pierced by a micrometeoroid, light is admitted through the hole which will produce an output signal from the cell. This type detector does not yield data which is very useful in predicting pentrations of structures in space vehicles.

A still further prior art micrometeoroid detector is a photo engraved type detector which consists of a very fine photo engraved gold grid on a Mylar film to detect the presence of micrometeoroids. The grid may be covered by a piece of test material. If the test material is punctured and the grid broken by a micrometeoroid, a change in resistance will occur in the telemetering circuit. The photo engraved grid detector is the only prior art micrometeoroid detector capable of making a direct measurement of the puncture hazard to thin structural materials. However, it has several disadvantages: It is very fragile; it will not withstand a very high temperature; it required that its temperature be monitored since its restistance changes with environmental temperature changes; and it may become shorted by the test material when punctured.

It is an object of this invention to provide a micrometeoroid detector which will give a direct measurement of the micrometeoroid hazard to thin structural materials used in space vehicles.

Another object of this invention is to provide a rugged micrometeoroid detector which will withstand very high temperatures.

A further object of this invention is to provide a micrometeoroid detector which is not affected by environmental temperature changes.

This invention is a micrometeoroid detector which can be attached to a satellite to provide a direct measurement of the micrometeoroid puncture hazard to thin structural materials in space. The detector consists of a base plate with the material to be tested attached to the base plate to form a pressure tight cell with the base plate being one side of the cell. A pressure sensitive capsule, which collapses when subjected to a pressure and which expands when the pressure is removed, is attached to the base plate inside the cell. A microswitch is attached to the base plate outside the cell opposite the pressure sensitive capsule. A plunger extends through the base plate between the inside the capsule and the switch so as to close the switch when the capsule is collapsed and to allow the switch to open when the capsule is expanded. A small hole is in the base plate with a tube connected to it to allow the cell to be put under pressure to close the switch. While the cell is under sufficient pressure to close the switch, the tube is crimped and sealed and the detector is attached to the satellite. After the satellite has been put into space and a micrometeoroid punctures the test material the pressure inside the cell will leak out causing the switch to open signaling the satellite's telemeter of the puncture.

Other objects and a fuller understanding of the invention may be had by referring to the following specification and the accompanying drawings in which.

Figure 1:
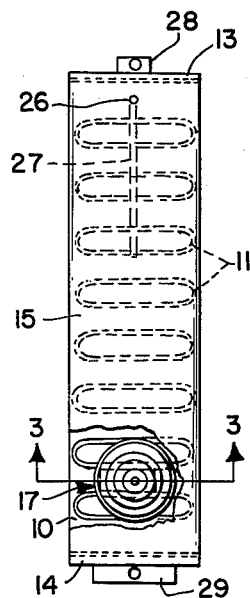
FIG. 1 shows a plan view of the preferred embodiment of the micrometeoroid detector which constitutes this invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 2:
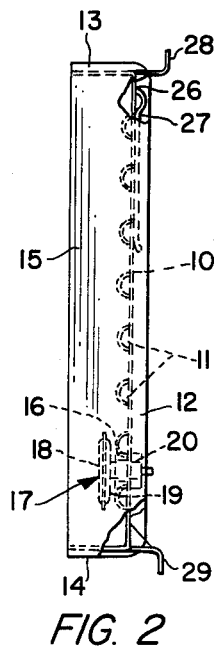
FIG. 2 shows a side view of the micrometeoroid detector shown in FIG. 1.
Figure 3:
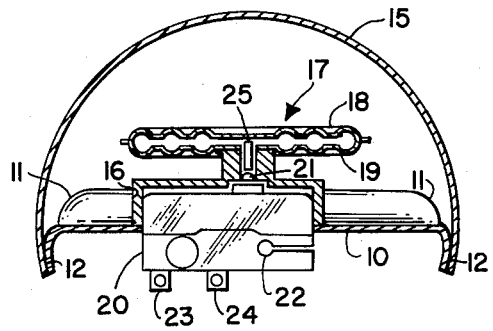
FIG. 3 shows a cross sectional view of FIG. 1 taken along the cross sectional lines 3—3.

Turning now to the specific embodiment of the invention selected for illustration in FIGS. 1, 2, and 3 of the drawings, the number 10 designates a thin base plate with eight corrugated sections 11 to rigidize it. The base plate has a turned down rim 12 around its outer edge with two turned up semicircular ends 13 and 14. A thin structural material 15, which is to be tested, is attached to the rim 12 to form a cell. The base plate has a hole cut in it and a switchbox 16 having an extension thereon is attached to the base plate inside the cell to cover the hole. A pressure capsule 17 consisting of two pressure sensitive diaphragms 18 and 19 is attached to the extension on switchbox 16 inside the cell. An on-off type microswitch 20 having a switch actuating means 21 is attached to switchbox 16 outside the cell. When actuating means 21 has a pressure below a predetermined level applied to it, switch 20 is open and when it has a pressure above the predetermined level applied to it, switch 20 is closed. A cam adjustment 22 regulates the predetermined level of pressure at which switch 20 opens or closes. Terminals 22 and 23 are the terminals to switch 20.

Switch 20 is attached to the extension on switchbox 16 in such a manner that switch actuating means 21 protrudes up into a hole which extends through the extension on switchbox 16 and diaphragm 19. A plunger 25 is located in this hole to transmit any pressure on diaphragm 18 to switch actuating means 21.

A hole 26 in base plate 10 with a tube 27 connected thereto is used to put the cell under pressure. When the pressure inside the cell is above the predetermined level referred to above (determined by adjustment cam 22) diaphragm 18 will transmit sufficient pressure through plunger 25 to close switch 20.

In the operation of the preferred embodiment of this invention, before the detector is put into space, the cell is sufficiently pressurized to close switch 20 and then tube 27 is sealed. The detector is attached to a satellite by mounting brackets 28 and 29 and then put into space. When a micrometeoroid punctures the test material 15, the pressure inside the cell will leak off causing pressure capsule 17 to expand opening switch 20. The opening of switch 20 is an indication that the test material 15 has been punctured by a micrometeoroid.

Figure 4:
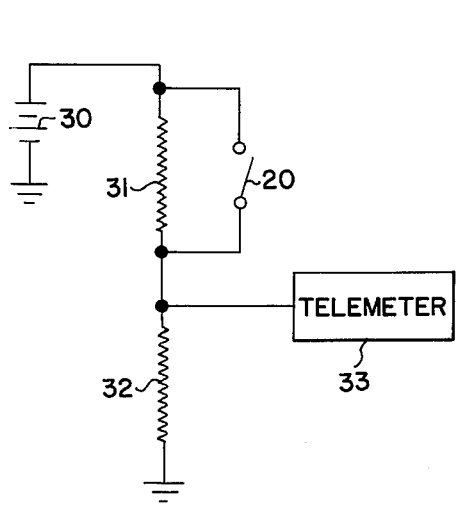
FIG. 4 shows an electrical circuit which can be used to signal the telemeter that the micrometeoroid detector has been punctured.

The fact that switch 20 has been opened can be transmitted to the telemeter on board the satellite by any suitable means. FIG. 4 discloses a simple electrical circuit which could be used for this purpose. A voltage source 30 is connected in series with two resistors 31 and 32. Switch 20 is connected across resistor 31. When the test material 15 has not been punctured by a micrometeoroid, switch 20 is closed and the voltage applied to telemeter 33 is equal to the voltage of voltage source 30. After the test material 15 has been punctured by a micrometeoroid, switch 20 is open and the voltage applied to telemeter 33 is less than the voltage of voltage source 30. Thus, the voltage level across resistor 32 is an indication whether or not the test material 15 has been punctured.

The base plate 10 is fabricated from beryllium copper sheet material with a thickness of .014 inch. The material is cut into a strip having semicircular ends. This strip is placed in a forming die where the eight corrugated sections 11 are formed with hydraulic pressure to rigidize it. The strip is then placed in a die which turns down a rim 12 around its outer edge. A bending fixture is then used to turn up the semicircular ends 13 and 14 of the strip. The base plate is completed by punching a hole for switch 20 and another hole 26 for tube 27. Switchbox 16 is then silver brazed to base plate 10.

The pressure capsule 17 is fabricated from two pressure sensitive diaphragms 18 and 19 which are formed by a hydraulic press from beryllium copper sheet material .008 inch thick. The diaphragms are silver brazed together to form a pressure tight capsule and are then silver brazed to switchbox 16. Induction heating is used to perform this operation. Age hardening of the beryllium copper is accomplished by controlling the temperature at 600° F. for three hours.

After the heat treating cycle, the oxides are removed and all edges are trimmed with 100 percent tin solder. The test material is tinned around its outer edges and then thoroughly cleansed of flux and foreign matter. The test material is wrapped on the base plate, the joints are crimped, and then soldered in place. One hundred percent tin, which has a melting point of 450° F., is used for soldering the joints. The test material 15 used as the tin test section of the detector is beryllium copper. Carefully selected fine grain pressure diaphragm stock is used as the test material because of its ability to be rolled into very thin sheets and still be impervious to the internal gas.

The detector is charged with helium to a pressure of 25 p.s.i.a. after the fabrication and assembly is completed. The fill tube 27 is used to admit the gas to the detector and is then sealed by mechanically crimping and soldering. The detector is leak checked in the vacuum chamber of a helium mass spectrometer type leak detector and discarded if there is any indication of a leak. The last of the construction consists of vacuum coating the detector with aluminum and silicon monoxide to control its temperature in the space environment.

The pressure sensitive capsule switch assembly is designed so the force transmitting member (plunger 25) and the switch 20 are installed on the outside of the pressure chamber. This eliminates the need for electrical and mechanical feed throughs in the pressure chamber wall. Also, the switch actuation pressure can be adjusted by cam adjusting means 22 without disturbing any pressure seals in the chamber. The switch contacts are located in a closed position until the sensor is punctured and the pressure allowed to escape. This switch arrangement eliminates the possibility of foreign matter collecting on the contacts during vehicle assembly and allows the monitoring of switch contact resistance during the prelaunch check.

The size and shape of the micrometeoroid pressurized cell detector may be changed to obtain the desired test material area and to conform to the configuration of the space vehicle. Stainless steel may be used as a direct substitute for the beryllium copper test material. Other materials may be used if they can be rolled to the desired thickness and still be impervious to the chamber gas.

One hundred and sixty pressurized cell detectors were attached to the Explorer 16 satellite. All 160 of these cells used beryllium copper at the test material. One hundred of them had a test material thickness of .001 inch, 40 of them had a test material thickness of .002 inch, and the other 20 of them had a test material thickness of .005 inch. After 391 passes of the satellite the telemeter on board the satellite indicated that 10 of the cells having a test material thickness of .001 inch were punctured, that one of the cells having a test material thickness of .002 inch was punctured and that none of the cells having a test material thickness of .005 inch was punctured.

This invention offers many advantages over prior art micrometeoroid detectors. Some of these advantages are: it is rugged and will withstand severe shock; it will withstand very high temperatures; it has a permanent memory; it never becomes shorted by the test material when punctured; it does not require continuous monitoring by the telemeter since the signal from the detector consists of a switch opening; and its signals to the telemeter will not be affected by environmental temperature changes.

It will be apparent to those skilled in the art that the novel principles of the invention disclosed herein with the specific exemplification thereof will suggest various modifications and applications of the same. For example, different materials and different material thicknesses could be used as the test material, also different sizes and shapes of pressurized cells could be used. It is accordingly desired that in construing the breadth of the appended claims they shall not be limited to the specific exemplification of the invention described herein.

What is claimed as new and desired to be secured by Letters Patent of the United States is:

1. A pressurized cell micrometeoroid detector for obtaining a direct measurement of the micrometeoroid puncture hazard to thin structural material comprising: a base plate with the thin structural material to be tested attached to the base plate to form a leak proof cell with the base plate as one side of the cell; a pressure sensitive capsule, which collapses when subjected to a pressure and which expands when the pressure is removed, attached to said base plate inside said cell; a switch attached to said base plate outside said cell; and means located between said capsule and said switch for closing said switch when said capsule is collapsed and for allowing said switch to open when said capsule is expanded whereby when said cell is subjected to a pressure and whenever a micrometeoroid punctures said test material said pressure inside said cell will leak out and open said switch to indicate said puncture.

2. A pressurized cell micrometeoroid detector for obtaining a direct measurement of the micrometeoroid puncture hazard to thin structural material comprising: a pressurized leak proof cell with the structural material to be tested forming at least a part of the cell whereby when a micrometeoroid punctures said structural material forming the cell the pressure inside the cell will leak out; a switch attached to the outside surface of said cell; and means, including a pressure-sensitive diaphragm located inside said cell which is collapsed when the cell is under pressure and which expands as the pressure inside the cell decreases, under the control of the pressure inside said cell for actuating said switch when said pressure falls below a predetermined level whereby said actuated switch indicates a micrometeoroid puncture of said structural material forming the cell.

3. A pressurized cell micrometeoroid detector as claimed in claim 2 wherein said means for actuating said switch further includes a means protruding into the wall of said cell under the control of said pressure sensitive diaphragm for closing the switch when the pressure sensitive diaphragm is collapsed and for allowing the switch to open when the pressure sensitive diaphragm is expanded a predetermined amount.

References Cited by the Examiner

UNITED STATES PATENTS

| | | | |
|---|---|---|---|
| 2,950,421 | 8/1960 | Langstroth | 200—83 X |
| 3,046,369 | 7/1962 | Hicks | 200—83 |

OTHER REFERENCES

Davison, E. H. and Winslow, P. C., Jr., Direct Evaluation of Meteoroid Hazards. In Aerospace Engineering 21 (2) pp. 24–33, February 1962 (pages 28 and 29 relied on).

Gatland, K. W., The Vanguard Project. In Spaceflight 1 (1), pages 15–28, October 1956 (page 27 of interest).

RICHARD C. QUEISSER, *Primary Examiner.*

DAVID SCHONBERG, *Examiner.*

J. JOSEPH SMITH, JR., *Assistant Examiner.*